3,692,628
PROCESS FOR PRODUCING L-SERINE
Kiyoshi Nakayama, Sagamihara-shi, and Hiroshi Kase, Koganei-shi, Japan, assignors to Kyowa Hakko Kogyo Co., Ltd., Tokyo, Japan
No Drawing. Filed Apr. 17, 1969, Ser. No. 817,202
Claims priority, application Japan, Apr. 18, 1968, 43/25,529
Int. Cl. C12d 13/06
U.S. Cl. 195—28 R      13 Claims

ABSTRACT OF THE DISCLOSURE

L-serine is produced by a fermentation process which comprises culturing a microorganism belonging to the genus Arthrobacter, Brevibacterium or Corynebacterium in an aqueous nutrient medium which does not contain DL-glyceric acid as a substrate. Inexpensive carbohydrates or hydrocarbons can be used as the carbon source in the medium. The strains exemplified include *Arthrobacter paraffineus, Brevibacterium ketoglutamicum* and *Corynebacterium hydrocarboclastus*.

---

This invention relates to a process for producing L-serine. More particularly, it relates to a process for the production of L-serine by fermentation. Even more particularly, the invention relates to a process for producing L-serine by fermentation with microorganisms in suitable nutrient media.

L-serine is a well-known amino acid which is used as a medicine and as a cosmetic. It is also a useful substance which can be employed in the preparation of other useful compounds, for example, N-methylserine.

Heretofore, L-serine had been manufactured by producing DL-serine by a synthetic method and then separating the product into the appropriate optical isomers. Recently, a process for the production of L-serine by using DL-glyceric acid as a substrate has been reported (Japanese patent publication No. 17,728/67). However, no process is known in the prior art for producing significant amounts of L-serine from low-priced carbohydrates, hydrocarbons, other carbon sources and nitrogen sources without the necessity of using expensive substances such as glyceric acid as a starting material.

One of the objects of the present invention is to provide an improved process for the production of L-serine which overcomes the disadvantages and deficiencies of the prior art methods.

Another object of the present invention is to provide a process for producing L-serine by fermentation which may be carried out in an efficacious and relatively simple manner.

A further object of the invention is to provide a process for producing L-serine by fermentation which may be carried out advantageously on an industrial scale at low cost to give a high yield of product.

A still further object of the invention is to provide L-serine.

These and other objects and advantages of the present invention will become apparent to those skilled in the art from a consideration of the following specification and claims.

As the result of various investigations on the production of L-serine in industrial quantities at low cost, the present inventor has found that significant amounts of L-serine are produced and accumulated in a cultured liquor when a bacterium belonging to the genus Arthrobacter, Brevibacterium or Corynebacterium is cultured in a nutrient medium containing carbohydrates, hydrocarbons or other carbon sources, etc., and, significantly, without the addition of DL-glyceric acid to the medium. The use of a medium which does not contain DL-glyceric acid is one of the novel findings of the invention.

Microorganisms to be employed in the present invention are bacteria belonging to the genus Arthrobacter, the genus Brevibacterium or the genus Corynebacterium. Isoleucine-requiring mutant strains are found to be especially excellent in attaining the objectives of the invention.

Either a synthetic culture medium or a natural nutrient medium is suitable for cultivation of the strains employed in the present invention as long as it contains the essential nutrients for the growth of the strain employed. Such nutrients are well known in the art and include substances such as a carbon source, a nitrogen source, inorganic compounds and the like which are utilized by the microorganism employed in appropriate amounts. Thus, as a carbon source, there may be mentioned, by way of example, carbohydrates such as glucose, fructose, maltose, sucrose, starch, starch hydrolysate, molasses, mannose, glycerol, sorbitol, mannitol, etc., or any other suitable carbon source such as sugar alcohols, organic acids, for example, acetic acid, lactic acid, pyruvic acid, fumaric acid, or amino acids such as aspartic acid, glutamic acid and the like, etc. In the case of using hydrocarbon-assimilating microorganisms, hydrocarbons, for example, n-paraffins, kerosene or petroleum fractions including light oils, heavy oils, paraffin oils and the like may be used in the nutrient medium as the source of carbon, or in combination with one or more than one of the carbon sources mentioned hereinabove. Either a single source of carbon or a mixture of two or more may be employed.

In accordance with the invention, however, the nutrient medium does not contain DL-glyceric acid. Accordingly, this substance is excluded from the carbon sources employed within the context and scope of the present invention.

As a nitrogen source, various kinds of inorganic or organic salts or compounds, such as urea, liquid ammonia or ammonium salts such as ammonium chloride, ammonium sulfate, ammonium nitrate, ammonium acetate, ammonium phosphate, ammonium carbonate, etc., or natural substances containing nitrogen, such as cornsteep liquor, yeast extract, meat extract, peptone, fish meal, or various digestion substances thereof, bouillon, casein hydrolysates, fish solubles, rice bran extract, defatted soybean dregs or digestion substances thereof, chrysalis hydrolysates, etc. may be employed. Again, these substances may be used either singly or in combinations of two or more.

Inorganic compounds which may be added to the culture medium include magnesium sulfate, sodium phosphate, potassium dihydrogen phosphate, potassium monohydrogen phosphate, ferrous sulfate, manganese chloride, calcium chloride, sodium chloride, zinc sulfate, manganese sulfate, calcium carbonate, etc.

If the microorganism employed requires other nutrients for its growth, adequate amounts of the nutrients needed to satisfy the particular requirement should, of course, be added to the culture medium. These nutrients are sometimes contained in the natural substances added to the medium as the source of nitrogen and need not be added in addition thereto. If desired, however, these substances may be added to the medium as such and include growth factors such as, for example, amino acids, vitamins such as thiamine, cobalamin, etc., or biotin.

Culturing is conducted under aerobic conditions, such as aerobic shaking of the culture or with aeration and agitation of a submerged culture, at a temperature of, for example, about 20° to 40° C. and at a pH of, for example, about 5.0 to 9.5. It is to be understood that the temperature and the pH may be varied, even outside the described limits, in accordance with the growth requirements of the particular microorganism utilized. In order to obtain high yields of L-serine, it is desirable to maintain the pH of the culture medium at approximately neutral (7.0) during culturing. After about 1 to 5 days of culturing under these conditions, significant amounts of L-serine are produced and accumulated in the resultant culture liquor.

After the completion of culturing, the microorganism cells and undesirable precipitates are removed from the culture liquor and the L-serine is recovered from the liquor by conventional means, such as an ion exchange resin treatment, extraction with solvents, precipitation, adsorption, chromatography, concentration or the like. An especially suitable method for recovery is the ion exchange resin treatment described in Example 1 hereinbelow.

The following examples are given merely as illustrative of the present invention and are not to be considered as limiting. Unless otherwise noted, the percentages therein and throughout the application are by weight per liter of water. Exemplary microorganism strains advantageously employed in the present invention are described therein. These strains, i.e. *Arthrobacter paraffineus* KY 7127 ATCC 21218, *Arthrobacter paraffineous* KY 7128 ATCC 21219, *Brevibacterium ketoglutamicum* ATCC 21222, and *Corynebacterium hydrocarboclastus* ATCC 21221, are deposited in the American Type Culture Collection in Rockville, Md.

EXAMPLE 1

The L-serine-producing strain *Arthrobacter paraffineus* KY 7127 ATCC 21218, an isoleucine and methionine-requiring microorganism, is used as the seed bacterium. This strain is inoculated into a 250-ml.-conical flask containing 20 ml. of a sterilized seed culture medium containing 2% sorbitol, 1% meat extract, 1% peptone, 0.5% yeast extract, 0.3% NaCl and 50 mg./l. of meso-diaminopimelic acid. Culturing is carried out with aerobic shaking at 30° C. for 24 hours in order to obtain a seed culture.

Two ml. of the resultant seed culture is inoculated into a 250 ml.-conical flask containing 20 ml. of a sterilized fermentation medium (pH 7.4) having the following composition:

5% n-alkane mixture ($C_{12}$–$C_{14}$)
2% $(NH_4)_2SO_4$
0.1% $K_2HPO_4$
0.1% $KH_2PO_4$
0.1% $MgSO_4 \cdot 7H_2O$
2% $CaCO_3$
1 mg./l. thiamine
100 mg./l. L-methionine
1 ml./l. of solution A Composition of solution A:

| | Mg./l. |
|---|---|
| $Na_2B_4O_7 \cdot 10H_2O$ | 88 |
| $(NH_4)_6Mo_7O_{24} \cdot 4H_2O$ | 37 |
| $FeCl_3 \cdot 6H_2O$ | 970 |
| $ZnSO_4 \cdot 7H_2O$ | 8.8 |
| $CuSO_4 \cdot 5H_2O$ | 20 |
| $MnCl_2 \cdot 4H_2O$ | 7.2 |

Culturing is then carried out with aerobic shaking of the culture in the fermentation medium at 30° C. for 96 hours. As a result, the amount of L-serine produced in the cultured liquor is 3.3 mg./ml.

Two liters of the filtrate obtained by removing the microorganism cells and other insoluble matters from the culture liquor is passed through a column of a polystyrene strongly acidic cation exchange resin [Diaion SKI, a trade name of an ion exchange resin manufactured by the Mitsubishi Kasei Co. Ltd.] so as to adsorb the L-serine. The column is washed with water and eluted with ammonia water. The fractions of L-serine which are collected are concentrated. As a result, 4.5 grams of crystals of L-serine is obtained.

EXAMPLE 2

Culturing is conducted in the same manner and under the same conditions as described in Example 1, except that a culture medium containing 5% of sorbitol instead of the described n-alkane mixture is used as a carbon source in the fermentation medium. The amount of L-serine produced as a result is 2.3 mg./ml.

EXAMPLE 3

*Arthrobacter paraffineus* KY 7128 ATCC 21219, an L-serine-producing microorganism which requires isoleucine, diaminopimelic acid or lysine for its growth, is used as the seed strain. Culturing is conducted in the same manner as described in Example 1 except that a fermentation medium having the following composition is used:

5% n-alkane mixture ($C_{12}$–$C_{14}$)
2% $(NH_4)_2SO_4$
0.1% $K_2HPO_4$
0.1% $KH_2PO_4$
0.1% $MgSO_4 \cdot 7H_2O$
2% $CaCO_3$
1 mg./l. thiamine
10 mg./l. L-isoleucine
100 mg./l. L-lysine hydrochloride
1 ml./l. of solution A (described above)

The amount of L-serine produced in the resultant culture liquor is 2.5 mg./ml.

EXAMPLE 4

Culturing is conducted in the same manner and under the same conditions as described in Example 3, except that a culture medium containing 5% of sorbitol instead of the mixture of n-alkanes is used as a carbon source in the fermentation medium. The amount of L-serine produced in the resultant culture liquor is 1.8 mg./ml.

EXAMPLE 5

The L-serine-producing microorganism strains *Brevibacterium ketoglutamicum* ATCC 21222 and *Corynebacterium hydrocarboclastus* ATCC 21221 are used as the seed microorganisms. These strains are induced from the parent strain *Brevibacterium ketoglutamicum* ATCC 15588 and *Corynebacterium hydrocarboclastus* ATCC 15592 and require isoleucine for their growth.

These microorganisms are cultured in the same manner as described in Example 1, except that a fermentation medium having the following composition is employed:

5% n-alkane mixture ($C_{12}$–$C_{14}$)
2% $(NH_4)_2SO_4$
0.1% $K_2HPO_4$
0.1% $KH_2PO_4$
0.1% $MgSO_4 \cdot 7H_2O$
2% $CaCO_3$
1 mg./l. thiamine
0.5% NZ-amine (a series of casein hydrolysates)
1 ml./l. of solution A (described above)

The pH of the medium is 7.4.

The amounts of L-serine produced in the resultant culture liquor with each of the strains are shown in Table 1.

TABLE 1

| Microorganisms employed: | Amount of L-serine produced, ml. |
|---|---|
| *Brevibacterium ketoglutamicum* ATCC 21222 | 1.7 |
| *Corynebacterium hydrocarboclastus* ATCC 21221 | 1.9 |

The invention being thus described, it will be obvious that the same may be varied in many ways. Such variations are not to be regarded as a departure from the spirit and scope of the invention, and all such modifications as would be obvious to one skilled in the art are intended to be included herein.

What is claimed is:

1. A process for producing L-serine which comprises culturing a microorganism selected from the group consisting of *Arthrobacter paraffineus* ATCC 21218, *Arthrobacter paraffineus* ATCC 21219, *Brevibacterium ketoglutamicum* ATCC 21222, and *Corynebacterium hydrocarboclastus* ATCC 21221, said microorganisms requiring isoleucine for growth, under aerobic conditions in an aqueous nutrient medium containing at least one hydrocarbon as the main source of carbon; accumulating L-serine in the resultant culture liquor; and isolating said L-serine therefrom.

2. The process of claim 1, wherein culturing is carried out at a temperature of about 20° to 40° C. and at a pH of about 5.0 to 9.5.

3. The process of claim 1, wherein said hydrocarbon is an n-paraffin.

4. The process of claim 1, wherein said microorganism is *Arthrobacter paraffineus* ATCC 21218.

5. The process of claim 1, wherein said microorganism is *Arthrobacter paraffineus* ATCC 21219.

6. The process of claim 1, wherein said microorganism is *Brevibacterium ketoglutamicum* ATCC 21222.

7. The process of claim 1, wherein said microorganism is *Corynebacterium hydrocarboclastus* ATCC 21221.

8. A process for producing L-serine which comprises culturing an L-serine-producing microorganism belong to the genus Arthrobacter, or the *Brevibacterium ketoglutamicum* ATCC 21222, or the strain of *Corynebacterium hydrocarboclastus* ATCC 21221, said microorganism requiring isoleucine for growth, under aerobic conditions in an aqueous nutrient medium which contains at least one carbohydrate as the main source of carbon, but does not contain DL-glyceric acid as a substrate, at a temperature of about 20° to 40° C. and at a pH of about 5.0 to 9.5; accumulating L-serine in the resultant culture liquor; and isolating said L-serine therefrom.

9. The process of claim 8, wherein said microorganism is *Arthrobacter paraffineus* ATCC 21218.

10. The process of claim 8, wherein said microorganism *Arthrobacter paraffineus* ATCC 21219.

11. The process of claim 8, wherein said microorganism *Brevibacterium ketoglutamicum* ATCC 21222.

12. The process of claim 8, wherein said microorganism is *Corynebacterium hydrocarboclastus* ATCC 21221.

13. The process of claim 8, wherein the L-serine is recovered from the resultant culture liquor by means of an ion exchange resin treatment.

References Cited

UNITED STATES PATENTS

| | | | |
|---|---|---|---|
| 3,222,258 | 12/1965 | Iizuka et al. | 195—29 |
| 3,511,752 | 5/1970 | Tanaka et al. | 195—28 |

OTHER REFERENCES

Kyowa Ind. I: "Lysine," Chem. Abs., vol. 67, #72,464 k, 1967.

Kyowa Ind. II: "Threonine," Chem. Abs., vol. 68, #86,141 k, 1968.

Ishii et al.: "J. Gen. Appl. Microbiol," vol 13, pp. 217–225, 1967.

A. LOUIS MONACELL, Primary Examiner

G. M. NATH, Assistant Examiner

U.S. Cl. X.R.

195—47